United States Patent
Watanabe et al.

(10) Patent No.: US 11,964,626 B2
(45) Date of Patent: Apr. 23, 2024

(54) SEAT BELT RETRACTOR AND SEAT BELT DEVICE

(71) Applicant: JOYSON SAFETY SYSTEMS JAPAN G.K., Shiga (JP)

(72) Inventors: Kiyoshi Watanabe, Shiga (JP); Tadayuki Asako, Shiga (JP)

(73) Assignee: JOYSON SAFETY SYSTEMS JAPAN G.K., Shiga (JP)

(*) Notice: Subject to any disclaimer, the term of this patent is extended or adjusted under 35 U.S.C. 154(b) by 0 days.

(21) Appl. No.: 18/036,385

(22) PCT Filed: Sep. 27, 2021

(86) PCT No.: PCT/JP2021/035249
§ 371 (c)(1),
(2) Date: May 10, 2023

(87) PCT Pub. No.: WO2022/102261
PCT Pub. Date: May 19, 2022

(65) Prior Publication Data
US 2024/0010162 A1   Jan. 11, 2024

(30) Foreign Application Priority Data
Nov. 13, 2020   (JP) ................ 2020-189605

(51) Int. Cl.
*B60R 22/36* (2006.01)
*B60R 22/34* (2006.01)

(52) U.S. Cl.
CPC ...... *B60R 22/36* (2013.01); *B60R 2022/3402* (2013.01)

(58) Field of Classification Search
CPC . B60R 22/46; B60R 22/36; B60R 2022/4642; B60R 22/4676; B60R 2022/3402
(Continued)

(56) References Cited

U.S. PATENT DOCUMENTS 6,152,391 A   11/2000   Nagata et al.
6,354,528 B1   3/2002   Nagata et al.
(Continued)

FOREIGN PATENT DOCUMENTS

DE   10253414 A1   6/2003
EP   3088261 A1   11/2016
(Continued)

OTHER PUBLICATIONS

English Translation of Watanabe JP-2020044969, filed Sep. 2018, published Mar. 2020, retrieved Feb. 2024 (Year: 2020).*
(Continued)

*Primary Examiner* — Amy R Weisberg
*Assistant Examiner* — Caitlin Anne Miller
(74) *Attorney, Agent, or Firm* — Fitch, Even, Tabin & Flannery LLP

(57) ABSTRACT

Provided are a seat belt retractor and a seat belt device capable of suppressing an increase in frictional resistance when a pretensioner is steadily driven and increasing the resistance to be applied to a webbing when energy is absorbed. A seat belt retractor includes a guide member facing at least a part of an outer circumferential surface of a locking base and disposed along an opening portion. The guide member is configured not to come into contact with the locking base until a pretensioner is shifted to a steady driving state, is configured to come into contact with the locking base when the pretensioner is steadily driven, and is configured to allow contact between lock teeth and the locking base when subjected to a predetermined load after the pretensioner is shifted to the steady driving state.

9 Claims, 8 Drawing Sheets

(58) Field of Classification Search
USPC .......................................................... 280/807
See application file for complete search history.

(56) References Cited

U.S. PATENT DOCUMENTS

| | | |
|---|---|---|
| 2003/0141398 A1 | 7/2003 | Nagata et al. |
| 2011/0011969 A1 | 1/2011 | Ogawa |
| 2015/0144727 A1 | 5/2015 | Nakayama et al. |
| 2016/0221534 A1 | 8/2016 | Asako |
| 2020/0086826 A1* | 3/2020 | Yanagawa ............ B60R 22/4633 |
| 2020/0298793 A1* | 9/2020 | Watanabe ............ B60R 22/4628 |
| 2020/0353892 A1 | 11/2020 | Wang et al. |
| 2022/0001834 A1* | 1/2022 | Kanamori ............ B60R 22/4633 |

FOREIGN PATENT DOCUMENTS

| | | | |
|---|---|---|---|
| JP | 2000302012 A | | 10/2000 |
| JP | 2014008920 A | | 1/2014 |
| JP | 2015054650 A | | 3/2015 |
| JP | 2018099943 A | | 6/2018 |
| JP | 2019214258 A | * | 12/2019 |
| JP | 2020044969 A | * | 3/2020 |
| WO | 2009123314 A1 | | 10/2009 |
| WO | 2014007092 A1 | | 1/2014 |
| WO | 2015037487 A1 | | 3/2015 |
| WO | 20180116719 A1 | | 6/2018 |
| WO | 2021117605 A1 | | 6/2021 |
| WO | WO-2021117605 A1 | * | 6/2021 |

OTHER PUBLICATIONS

JPO, Application No. PCT/JP2021/035249, International Search Report and Written Opinion with partial English translation, dated Nov. 16, 2021.

* cited by examiner

SEAT BELT RETRACTOR AND SEAT BELT DEVICE

CROSS-REFERENCE TO RELATED APPLICATIONS

This application is a U.S. national phase application filed under 35 U.S.C. § 371 of International Application No. PCT/JP2021/035249, filed Sep. 27, 2021, which is based upon and claims the benefit of priority from prior Japanese Application No. 2020-189605, filed Nov. 13, 2020.

TECHNICAL FIELD

The present invention relates to a seat belt retractor and a seat belt device, and more particularly, to a seat belt retractor and a seat belt device capable of controlling a load fluctuation after operation of a pretensioner.

BACKGROUND ART

A vehicle such as an automobile is generally provided with a seat belt device that restrains an occupant on a seat including a seat portion on which the occupant sits and a backrest portion positioned behind the occupant. Such a seat belt device includes a webbing that restrains the occupant, a seat belt retractor that winds up the webbing, a buckle disposed on a side surface of the seat, and a tongue disposed on the webbing, and the webbing restrains the occupant on the seat when the tongue is fitted into the buckle.

The seat belt retractor generally includes a spool that winds up the webbing, a base frame that rotatably encloses the spool, a pretensioner capable of winding up the webbing in an emergency, a lock mechanism capable of stopping the pull-out of the webbing, and a locking base that connects the spool and the lock mechanism.

In a seat belt retractor including such a pretensioner, the problem is that, in an emergency such as a vehicle collision, a rotation shaft of the spool is eccentric when the pretensioner is operated, and the locking base comes into contact with lock teeth formed in an opening portion of the base frame and frictional resistance increases.

To solve this problem, in the invention described in Patent Literature 1, a guide (30) is provided on a cover plate (26) covering an outer circumference of a lock base (38) and rotatably supports the lock base (38). The lock base corresponds to the locking base, and the cover plate corresponds to a pretensioner cover.

CITATION LIST

Patent Literature

Patent Literature 1: JP2018-99943A

SUMMARY OF INVENTION

Technical Problem

When an upper body of the occupant moves forward as in the case of a vehicle collision or the like, the seat belt retractor may be subjected to a load greater than or equal to that when the pretensioner is operated. In such a case, in order to absorb the energy generated by the occupant, it may be better to pull out the webbing little by little while applying a certain amount of resistance to the webbing.

However, in the invention described in the above Patent Literature 1, since the guide (30) is disposed, the lock base (38) and inner teeth formed in the opening portion of the cover plate (26) are always out of contact, and therefore, the webbing may lack resistance when absorbing energy.

The present invention has been made in view of such problems, and an object thereof is to provide a seat belt retractor and a seat belt device capable of suppressing an increase in frictional resistance when the pretensioner is steadily driven and increasing the resistance to be applied to the webbing when energy is absorbed.

Solution to Problem

According to the present invention, there is provided a seat belt retractor including: a spool configured to wind up a webbing that restrains an occupant; a base frame configured to rotatably enclose the spool; a pretensioner capable of winding up the webbing in an emergency; a lock mechanism capable of stopping the pull-out of the webbing; and a locking base configured to connect the spool and the lock mechanism, in which the base frame includes: an opening portion through which the locking base is inserted, lock teeth formed on an inner circumference of the opening portion and capable of engaging with a part of the lock mechanism, and a guide member facing at least a part of an outer circumferential surface of the locking base and disposed along the opening portion, and the guide member is configured not to come into contact with the locking base until the pretensioner is shifted to a steady driving state, is configured to come into contact with the locking base when the pretensioner is steadily driven, and is configured to allow contact between the lock teeth and the locking base when subjected to a predetermined load after the pretensioner is shifted to the steady driving state.

The guide member may be plastically deformed when subjected to the predetermined load.

The guide member may include, in an initial state, a main body portion having a gap $\alpha$ with the locking base, and an extension portion adjacent to an upstream side of the main body portion and having a gap $\delta$ with the locking base, and a gap $\beta$ between the locking base and the opening portion may have a relation of $\alpha \leq \beta < \delta$.

The guide member may include a distal end portion adjacent to an upstream side of the extension portion and having a gap $\varepsilon$ with the locking base, and the relation may be $\varepsilon > \delta$.

The distal end portion may include a tapered surface inclined toward the upstream side.

The guide member may include a plurality of fixed terminals disposed in the main body portion and the extension portion.

The guide member may have a predetermined gap $\gamma$ between a back surface thereof and the base frame.

In the seat belt retractor, a ring gear rotated by operation of the pretensioner may be disposed on a shaft portion of the locking base, and the guide member may be disposed in a region opposite to a portion where a power transmission member of the pretensioner rotates the ring gear.

According to the present invention, there is provided a seat belt device including a seat belt retractor having any one of the configurations described above.

Advantageous Effects of Invention

According to the seat belt retractor and the seat belt device of the present invention described above, since the guide member is disposed at a position facing the outer circumferential surface of the locking base, even when a rotation shaft of the spool is eccentric when the pretensioner is steadily driven, the locking base comes into contact with the guide member, so that the contact between the locking base and the lock teeth can be restricted, and an increase in frictional resistance can be suppressed.

Since the guide member is configured to allow contact between the locking base and the lock teeth when subjected to a predetermined load after the pretensioner is shifted to the steady driving state, it is possible to increase the resistance to be applied to the webbing when the energy of the occupant is absorbed after the operation of the pretensioner is completed.

BRIEF DESCRIPTION OF DRAWINGS

FIG. 2A and FIG. 2B are enlarged views of a guide member, in which FIG. 2A is a perspective view showing a front side, and FIG. 2B is a perspective view showing a back side.

FIG. 3A and FIG. 3B are cross-sectional views showing an initial state, in which FIG. 3A is a cross-sectional view of a plane including a ring gear, and FIG. 3B is a cross-sectional view of a plane including the guide member.

FIGS. 4A to 4D are diagrams illustrating an action of the guide member, in which FIG. 4A shows an initial state of a cross-sectional view taken along line A-A of FIG. 3B, FIG. 4B shows an initial state of a cross-sectional view taken along line B-B of FIG. 3B, FIG. 4C shows a steady driving state of the cross-sectional view taken along the line A-A of FIG. 3B, and FIG. 4D shows a load-applied state of the cross-sectional view taken along the line A-A of FIG. 3B.

FIG. 5A and FIG. 5B are diagrams showing an operation start state of a pretensioner, in which FIG. 5A is a cross-sectional view of a plane including the ring gear, and FIG. 5B is a cross-sectional view of a plane including the guide member.

FIG. 6A and FIG. 6B are diagrams showing a steady driving state of the pretensioner, in which FIG. 6A is a cross-sectional view of a plane including the ring gear, and FIG. 6B is a cross-sectional view of a plane including the guide member.

FIG. 7A and FIG. 7B are diagrams illustrating an action of a distal end portion of the guide member, in which FIG. 7A shows a relation with a power transmission member, and FIG. 7B shows a relation with a locking base.

DESCRIPTION OF EMBODIMENTS

Figure 1:
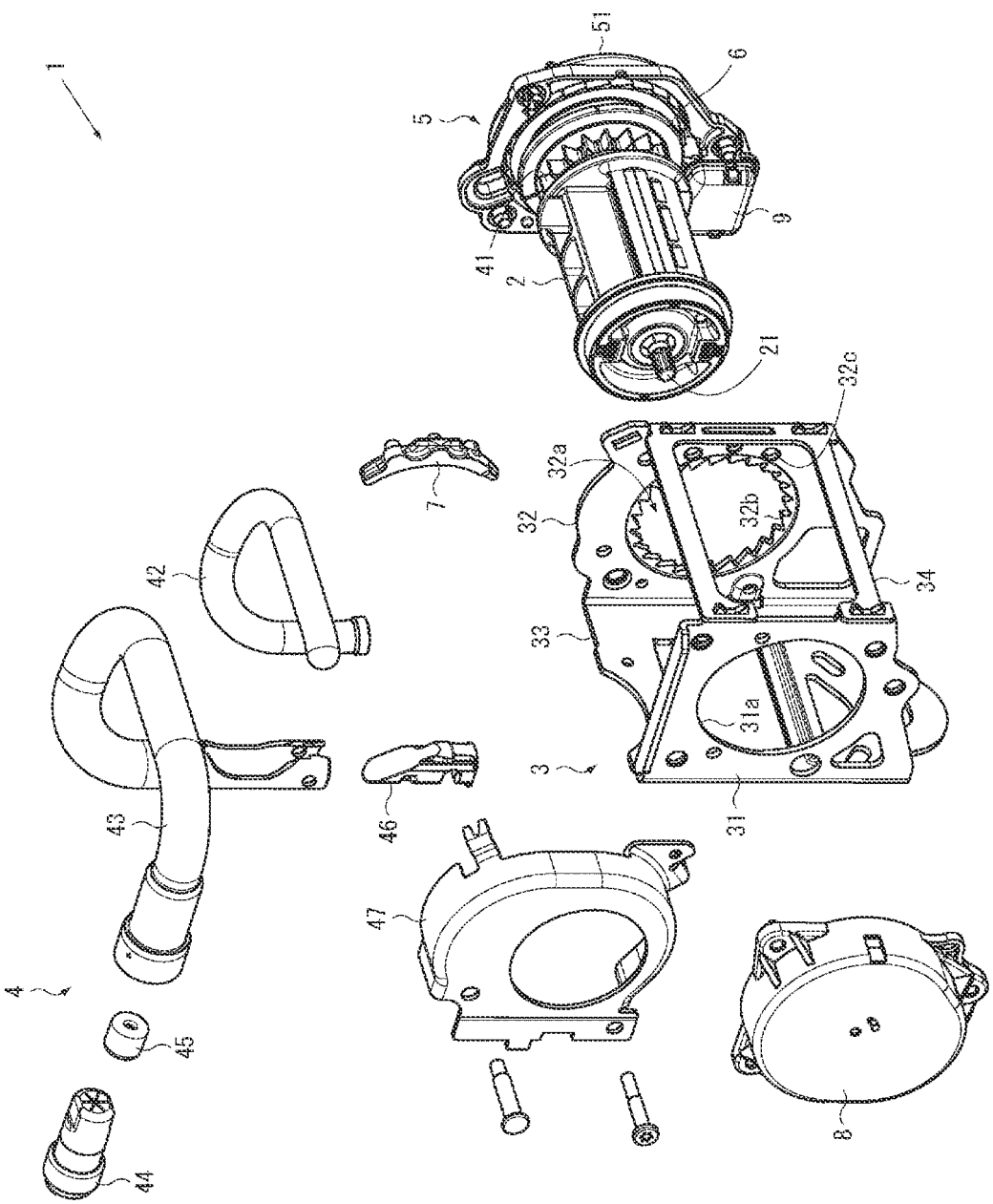
FIG. 1 is a component development view showing a seat belt retractor according to an embodiment of the present invention.
Figure 2A:
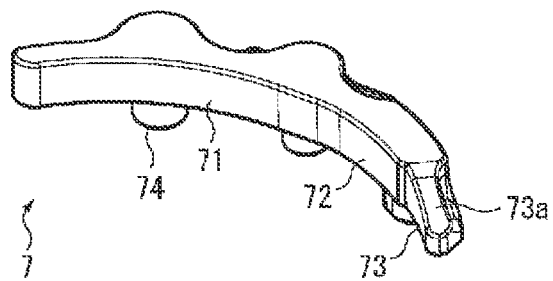
Figure 2B:
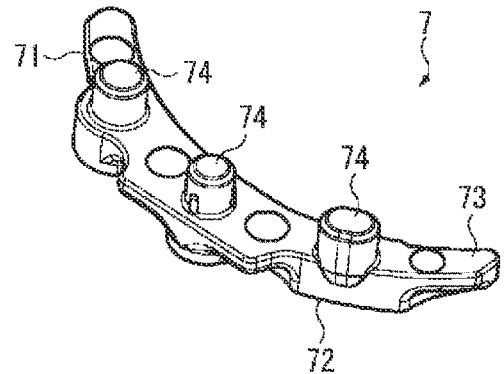
Figure 3A:
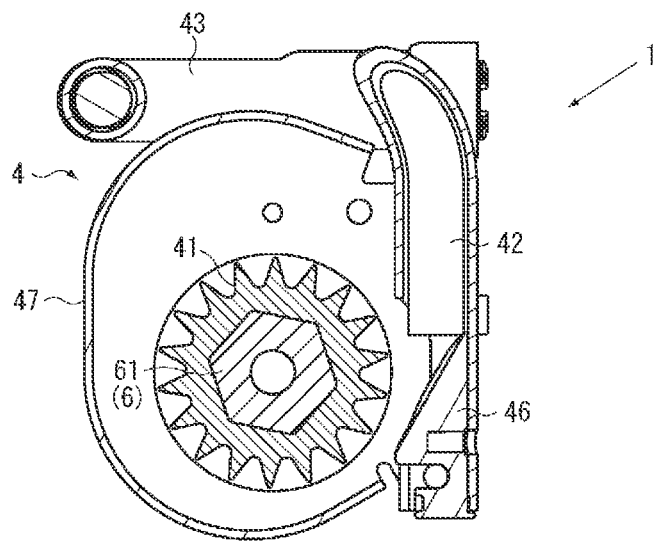
Figure 3B:
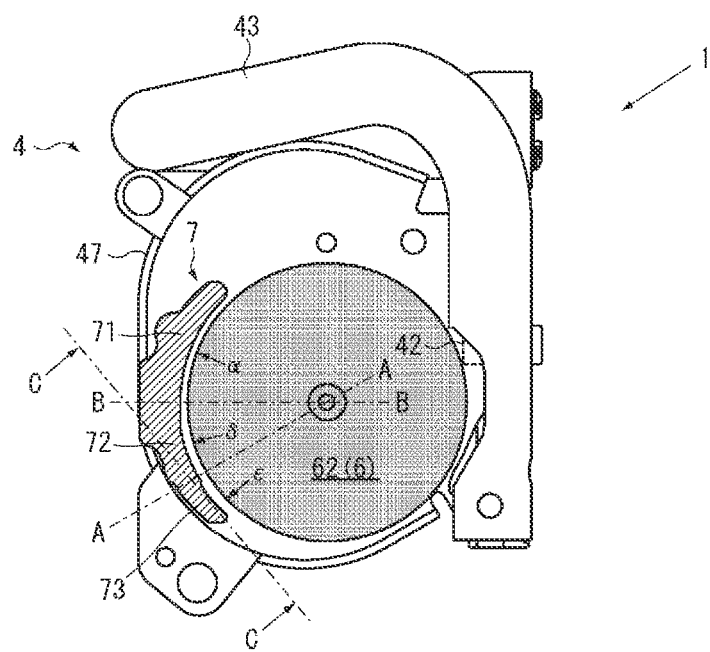

Hereinafter, an embodiment of the present invention will be described with reference to FIGS. 1 to 8. Here, FIG. 1 is a component development view showing a seat belt retractor according to the embodiment of the present invention. FIG. 2A and FIG. 2B are enlarged views of a guide member, in which FIG. 2A is a perspective view showing a front side, and FIG. 2B is a perspective view showing a back side. FIG. 3A and FIG. 3B are cross-sectional views showing an initial state, in which FIG. 3A is a cross-sectional view of a plane including a ring gear, and FIG. 3B is a cross-sectional view of a plane including the guide member. In FIG. 3B, a locking base 6 is grayed out for the convenience of description.

As shown in FIG. 1, a seat belt retractor 1 according to the embodiment of the present invention includes, for example, a spool 2 that winds up a webbing that restrains an occupant, a base frame 3 that rotatably encloses the spool 2, a pretensioner 4 capable of winding up the webbing in an emergency, a lock mechanism 5 capable of stopping the pull-out of the webbing, and the locking base 6 that connects the spool 2 and the lock mechanism 5, in which the base frame 3 includes: an opening portion 32a through which the locking base 6 is inserted, lock teeth 32b formed on an inner circumference of the opening portion 32a and capable of engaging with a part of the lock mechanism 5, a guide member 7 facing at least a part of an outer circumferential surface of the locking base 6 and disposed along the opening portion 32a, and a spring unit 8 that applies a force in a wind-up direction to the spool 2.

The spool 2 is a winding cylinder that winds up the webbing, and is rotatably accommodated in the base frame 3 forming a skeleton of the seat belt retractor 1. The base frame 3 includes, for example, a pair of first end surface 31 and second end surface 32 facing each other, and a side surface 33 connecting the first end surface 31 and the second end surface 32. The base frame 3 may include a tie plate 34 that faces the side surface 33 and is connected to the first end surface 31 and the second end surface 32.

In the seat belt retractor 1 according to the present embodiment, the spring unit 8 is disposed on the first end surface 31, and the pretensioner 4 and the lock mechanism 5 are disposed on the second end surface 32. The disposal of the spring unit 8, the pretensioner 4, the lock mechanism 5, and the like is not limited to the illustrated configuration. For example, the pretensioner 4 and the spring unit 8 may be disposed on the first end surface 31, and the lock mechanism 5 may be disposed on the second end surface 32.

An opening portion 31a through which a shaft portion of the spool 2 is inserted is formed in the first end surface 31 of the base frame 3, and the opening portion 32a having the lock teeth 32b capable of engaging with a pawl (not shown) of the lock mechanism 5 is formed in the second end surface 32 of the base frame 3. A pretensioner cover 47 that forms a passage of a power transmission member 42 of the pretensioner 4 is disposed on an inner surface (a surface facing the first end surface 31) of the second end surface 32 of the base frame 3. The lock mechanism 5 is disposed on an outer surface (a surface on a back side of the inner surface) of the second end surface 32 of the base frame 3, and the lock mechanism 5 is accommodated in a retainer cover 51.

The retainer cover 51 may be provided with a vehicle sensor 9 that detects sudden deceleration or inclination of a vehicle body. The vehicle sensor 9 includes, for example, a spherical mass body and a sensor lever swung by the movement of the mass body. The vehicle sensor 9 may be fitted into and fixed to the opening portion formed in the second end surface 32 of the base frame 3.

The spool 2 has, for example, a cavity in its central portion, and a torsion bar 21 forming an axis is inserted through the spool 2. The torsion bar 21 has a first end portion connected to a spring core (not shown) of the spring unit 8 and a second end portion connected to the locking base 6. Therefore, the spool 2 is normally configured to rotate together with the torsion bar 21 and the locking base 6.

The configuration of the spool 2 is not limited to the configuration described above, and the torsion bar 21 may be omitted as necessary. A means for applying a wind-up force to the spool 2 is not limited to the spring unit 8, and may be another means using an electric motor or the like.

The locking base 6 includes, for example, a shaft portion 61 inserted into and fixed to an opening portion of the spool 2, a flange portion 62 having a diameter larger than that of the opening portion 32a formed in the second end surface 32 of the base frame 3, and a substantially columnar or substantially cylindrical convex portion 63 inserted into the opening portion 32a. A ring gear 41 rotated by the operation of the pretensioner 4 is disposed between the spool 2 and the flange portion 62 of the locking base 6.

Since the flange portion 62 is a portion that functions as a stopper of the locking base 6, the flange portion 62 has a diameter larger than a hole diameter of the opening portion 32a of the base frame 3. A pawl (not shown) is disposed on the convex portion 63 so as to be retractable from a side surface portion. When the lock mechanism 5 is operated, the pawl protrudes from the side surface portion of the convex portion 63, whereby the pawl is locked to the lock teeth 32b formed in the opening portion 32a of the base frame 3, and the rotation of the locking base 6 in a webbing pull-out direction is restrained.

Therefore, even when a load is applied in the webbing pull-out direction when the lock mechanism 5 is operated, the spool 2 can be held in a non-rotation state until a load equal to or greater than a threshold is applied in the torsion bar 21. When a load equal to or greater than the threshold value is applied in the torsion bar 21, the torsion bar 21 is twisted to cause the spool 2 to rotate relative to the torsion bar 21, and the webbing is pulled out.

Although not shown in detail, the lock mechanism 5 includes, for example, a lock gear disposed adjacent to the locking base 6, a flywheel swingably disposed on the lock gear, and the retainer cover 51 accommodating the lock gear and the flywheel. When the webbing is pulled out faster than normal, the flywheel swings and engages with internal teeth formed on a wall member erected on the retainer cover 51. When the vehicle sensor 9 is operated, the sensor lever engages with external teeth formed on an outer circumferential surface of the lock gear.

In this way, the rotation of the lock gear is restricted by the operation of the flywheel or the vehicle sensor 9. When the rotation of the lock gear is restricted, relative rotation occurs between the locking base 6 and the lock gear, and the pawl protrudes from the side surface portion of the convex portion 63 along with this relative rotation.

The lock mechanism 5 is not limited to the configuration described above, and various configurations present in the related art can be freely selected and used. Instead of the torsion bar 21, the spool 2 may include an impact-absorbing mechanism configured by a combination of a shaft and a wire-shaped or plate-shaped plastic deforming member.

The pretensioner 4 includes, for example, the ring gear 41 disposed on the shaft portion 61 of the locking base 6, the power transmission member 42 that rotates the ring gear 41, a pipe 43 that accommodates the power transmission member 42 and guides movement, a gas generator 44 that applies a thrust force to the power transmission member 42, a piston 45 disposed at a rear end of the power transmission member 42 and sealing a gap between the power transmission member 42 and the pipe 43, a guide block 46 disposed at a distal end of the pipe 43 and guiding the power transmission member 42 to the ring gear 41, and the pretensioner cover 47 that accommodates the ring gear 41 and forms the passage of the power transmission member 42. The ring gear 41 may be referred to as a drive wheel or a rotation member.

The power transmission member 42 is made of resin and has an elongated rod shape, for example, and is configured to be engaged with teeth of the ring gear 41 and move while being plastically deformed to rotate the ring gear 41.

The configuration of the pretensioner 4 is not limited to the configuration described above. For example, a metal spherical body or a rod-shaped rack may be used as the power transmission member 42. Instead of the guide block 46, the pretensioner 4 may be configured to guide the movement of the power transmission member 42 by an extension of a part of the pipe 43.

In the present embodiment, the pretensioner 4 is disposed on the inner surface (facing the first end surface 31) of the base frame 3, but the pretensioner 4 may be disposed on the outer surface (a side of the second end surface 32 on which the lock mechanism 5 is disposed) of the base frame 3. In this case, the pretensioner cover 47 is disposed outside the second end surface 32 of the base frame 3.

The guide member 7 has, for example, a substantially partially annular shape as shown in FIG. 2A and FIG. 2B. Here, the "substantially partially annular shape" means that the entire guide member 7 has a partially annular shape. The guide member 7 may be a cast product (die-cast product) formed by press-fitting an alloy such as aluminum into a mold.

For example, as shown in FIG. 3B, the guide member 7 includes, in the initial state, a main body portion 71 having a gap $\alpha$ with the flange portion 62 of the locking base 6, an extension portion 72 adjacent to an upstream side of the main body portion 71 and having a gap $\delta$ with the flange portion 62 of the locking base 6, and a distal end portion 73 adjacent to an upstream side of the extension portion 72 and having a gap c with the flange portion 62 of the locking base 6.

In the present embodiment, the "upstream side" means an upstream side in a movement direction of the power transmission member 42. In the present embodiment, the "initial state" means a state before the operation of the pretensioner 4 or a state in which the pretensioner is assembled.

As shown in FIG. 3B, the guide member 7 is fixed to the second end surface 32 of the base frame 3 so as to face an outer circumferential surface of the flange portion 62 of the locking base 6. Since the guide member 7 is a component that restricts the movement of the locking base 6 when the pretensioner 4 is operated, the guide member 7 is disposed in a region opposite to a portion (an entry position) where the power transmission member 42 is engaged with the ring gear 41. At this time, the main body portion 71 is positioned in a direction in which the rotation shaft of the spool 2 is eccentric when the pretensioner 4 is steadily driven, and the extension portion 72 is disposed so as to be positioned in the direction in which the rotation shaft of the spool 2 is eccentric when the pretensioner 4 is started.

As shown in FIG. 2B, the guide member 7 may include a plurality of fixed terminals 74 disposed in the main body portion 71 and the extension portion 72. The fixed terminal 74 is, for example, a protrusion formed on a back surface of the guide member 7. Each of the fixed terminals 74 is inserted into a through hole 32c formed in the second end surface 32 of the base frame 3 and then crimped to fix the guide member 7 to the base frame 3. By disposing the plurality of fixed terminals 74 on the guide member 7 in this manner, the guide member 7 can be stably and firmly fixed to the base frame 3.

However, the fixing method of the guide member 7 is not limited to "crimping" (applying pressure to cause plastic deformation), and may be fixed by, for example, a bolt, a pin, an adhesive, or the like. Since the guide member 7 is a member that adjusts the narrow gap α with the locking base 6 and requires a certain load resistance, it is preferable to use crimping that is excellent in positioning accuracy and strength.

Here, sizes of the gap α, the gap δ, and the gap ε have a relation of α<δ<ε as shown in FIG. 3B. When a gap between the convex portion 63 of the locking base 6 and the lock teeth 32b formed in the opening portion 32a of the base frame 3 (second end surface 32) is defined as β, then α≤β<δ.

Figure 4A:
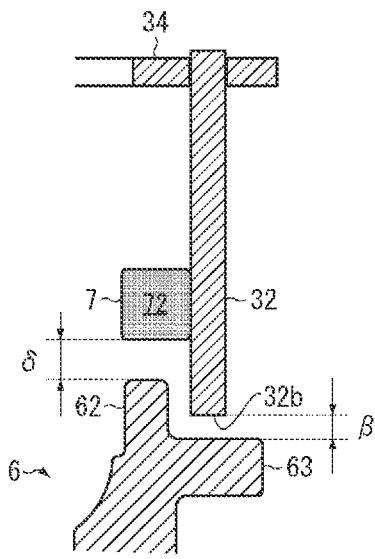
Figure 4B:
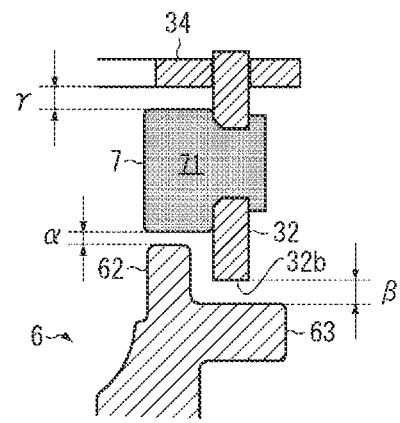
Figure 4C:
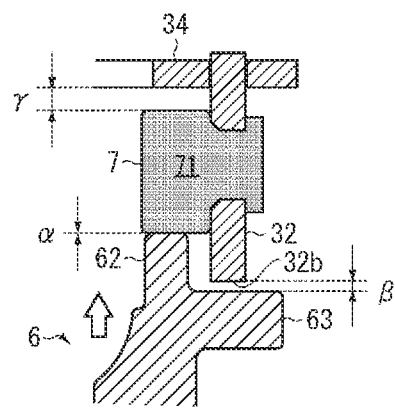
Figure 4D:
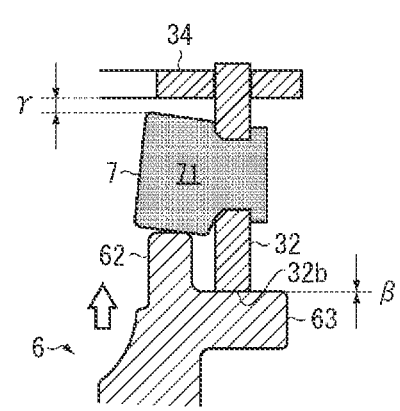

First, actions of the gap α with the main body portion 71 and the gap δ with the extension portion 72 will be described with reference to FIG. 4A to FIG. 6B. FIGS. 4A to 4D are diagrams illustrating an action of the guide member, in which FIG. 4A shows an initial state of a cross-sectional view taken along line A-A of FIG. 3B, FIG. 4B shows an initial state of a cross-sectional view taken along line B-B of FIG. 3B, FIG. 4C shows a steady driving state of the cross-sectional view taken along the line A-A of FIG. 3B, and FIG. 4D shows a load-applied state of the cross-sectional view taken along the line A-A of FIG. 3B. In FIGS. 4A to 4D, the guide member 7 is grayed out for the convenience of description.

As shown in FIG. 4A, in the initial state, the extension portion 72 of the guide member 7 has the gap δ with the flange portion 62 of the locking base 6. At this time, the gap pi is formed between the convex portion 63 of the locking base 6 and a distal end of the lock teeth 32b formed in the opening portion 32a of the base frame 3 (second end surface 32).

The sizes of the gap δ and the gap β have a relation of δ>β. Therefore, even when the locking base 6 is pushed by the power transmission member 42 and moves upward when the pretensioner 4 is operated, the convex portion 63 may come into contact with the lock teeth 32b, but the flange portion 62 is designed so as not to come into contact with the guide member 7 (extension portion 72).

Figure 5A:
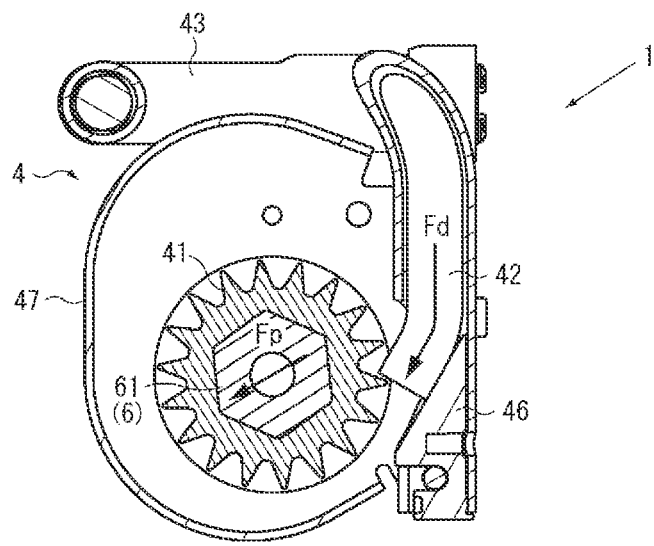
Figure 5B:
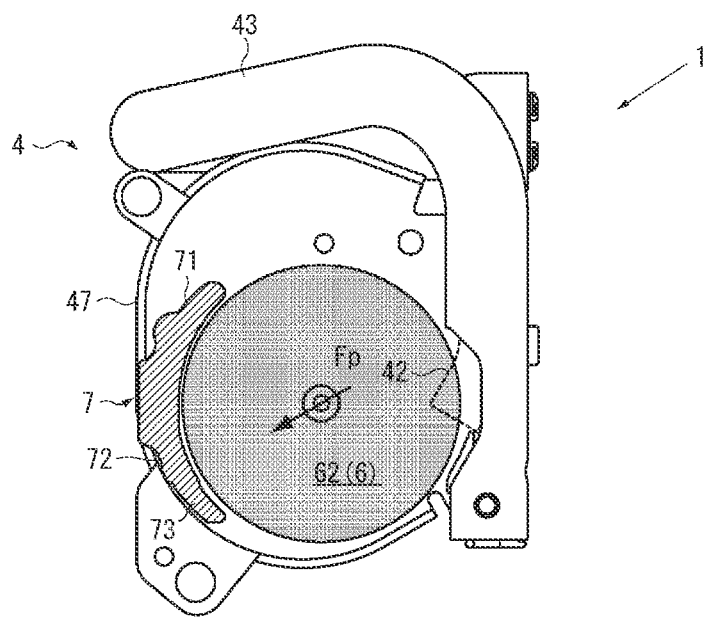

FIG. 5A and FIG. 5B are diagrams showing an operation start state of the pretensioner, in which FIG. 5A is a cross-sectional view of a plane including the ring gear, and FIG. 5B is a cross-sectional view of a plane including the guide member. In FIG. 5B, the locking base 6 is grayed out for the convenience of description.

When the pretensioner 4 is started, as shown in FIG. 5A, the power transmission member 42 is pushed out from the pipe 43, deflected by the guide block 46, and collides with teeth of the ring gear 41. At this time, due to a thrust force Fd of the power transmission member 42, a load Fp in a lower-left direction of the drawing (approximately 8 o'clock direction in terms of an hour hand of a clock) is applied in the ring gear 41.

Since the ring gear 41 is fixed to the shaft portion 61 of the locking base 6, as shown in FIG. 5B, the locking base 6 moves in the lower-left direction of the drawing (approximately 8 o'clock direction in terms of an hour hand of a clock) by the load Fp. At this time, since the extension portion 72 or the distal end portion 73 of the guide member 7 is present in the movement direction of the load Fp, the flange portion 63 of the locking base 6 is configured not to come into contact with the guide member 7.

When the pretensioner 4 is started, a larger load is applied than when the pretensioner 4 is steadily driven, and if this load is to be received by the guide member 7, the impact on the guide member 7 will increase and countermeasures must be taken. Even if the locking base 6 comes into contact with the lock teeth 32b of the base frame 3 when the pretensioner 4 is started, the contact is temporary and has little effect on the performance of the pretensioner 4.

As shown in FIG. 4B, in the initial state, the main body portion 71 of the guide member 7 has the gap α with the flange portion 62 of the locking base 6. At this time, the gap β is formed between the convex portion 63 of the locking base 6 and a distal end of the lock teeth 32b formed in the opening portion 32a of the base frame 3 (second end surface 32).

The sizes of the gap α and the gap D have a relation of α≤β. Here, α<β is illustrated. Therefore, when the locking base 6 is pushed by the power transmission member 42 and moved upward in the drawing when the pretensioner 4 is operated, it is designed such that the flange portion 62 comes into contact with the guide member 7 (main body portion 71), and the convex portion 63 is designed not to come into contact with the lock teeth 32b.

As shown in FIG. 4B, the back surface of the guide member 7 is configured to have a predetermined gap γ with and the tie plate 34 constituting the base frame 3. By forming the gap γ, as will be described later, a space in which the guide member 7 can be plastically deformed toward the tie plate 34 can be secured.

Figure 6A:
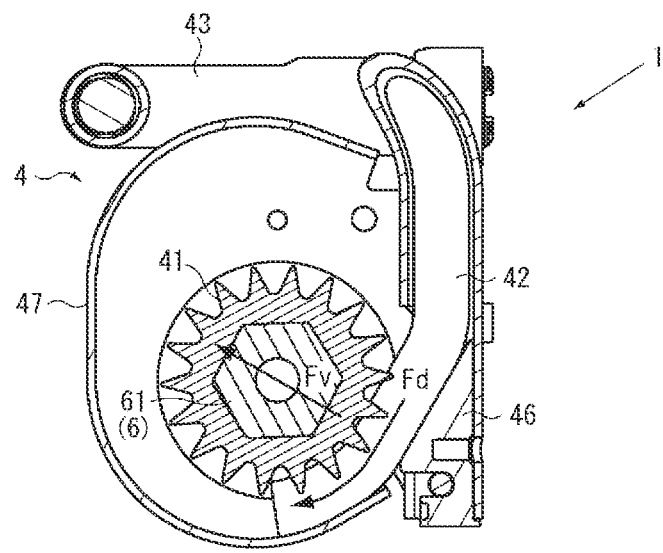
Figure 6B:
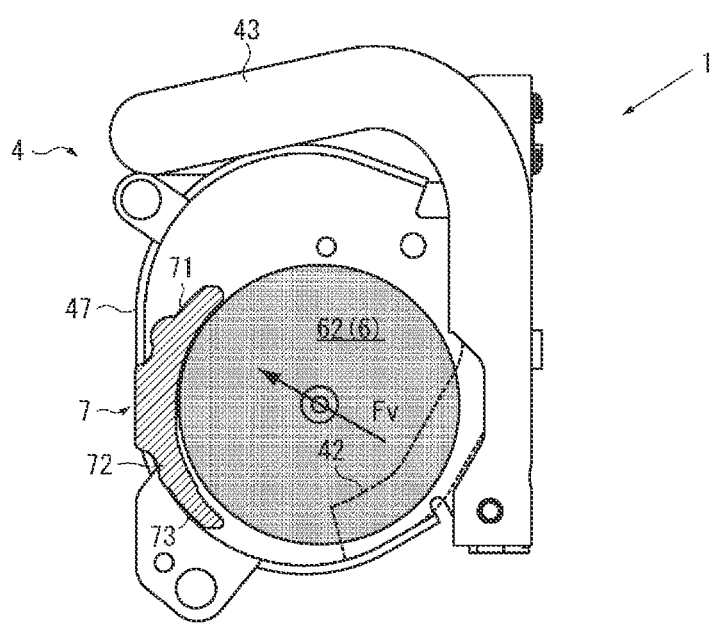

Here, FIG. 6A and FIG. 6B are diagrams showing a steady driving state of the pretensioner, in which FIG. 6A is a cross-sectional view of a plane including the ring gear, and FIG. 6B is a cross-sectional view of a plane including the guide member. In FIG. 6B, the locking base 6 is grayed out for the convenience of description.

When the power transmission member 42 further advances after the pretensioner 4 is started, as shown in FIG. 6A, the power transmission member 42 enters between the ring gear 41 and the guide block 46, and rotates the ring gear 41 while being plastically deformed. This state is referred to as the "steady driving state" in the present specification. In this steady driving state, since the power transmission member 42 is pushed into a narrow gap between the ring gear 41 and the guide block 46, due to the thrust force Fd of the power transmission member 42, a load Fv is applied to the ring gear 41 in a direction (approximately 10 o'clock direction in terms of an hour hand of a clock) substantially perpendicular to an entry direction of the power transmission member 42.

Since the ring gear 41 is fixed to the shaft portion 61 of the locking base 6, as shown in FIG. 6B, the locking base 6 moves in a direction (approximately 10 o'clock direction in terms of an hour hand of a clock) perpendicular to the entry direction of the power transmission member 42 by the load Fv. At this time, as shown in FIG. 4C, the locking base 6 moves toward the guide member 7, the gap α disappears (α=0), the flange portion 62 comes into contact with the main body portion 71 of the guide member 7, and the movement of the locking base 6 is restricted.

When a predetermined load is applied to the guide member 7 during or after the steady driving, the guide member 7 is plastically deformed and the gap β disappears (β=0), which allows the lock teeth 32b and the locking base 6 to come into contact with each other. At this time, the gap γ formed on the back surface of the guide member 7 is designed so as not to disappear even when the guide member 7 is plastically deformed.

In this way, by forming the guide member 7 to be plastically deformable with a predetermined load, for example, when an upper body of an occupant moves forward as in the case of a vehicle collision or the like and the seat belt retractor 1 is subjected to a load greater than or equal to that when the pretensioner 4 is operated, in order to absorb the energy generated by the occupant, the webbing can be pulled out gradually little by little while a certain amount of resistance is applied.

According to the seat belt retractor 1 of the present embodiment described above, since the guide member 7 is disposed at a position facing the outer circumferential surface of the locking base 6, even when the rotation shaft of the spool 2 is eccentric when the pretensioner 4 is steadily driven, the locking base 6 comes into contact with the guide member 7, whereby the contact between the locking base 6 and the lock teeth 32b can be restricted, and an increase in frictional resistance can be suppressed.

Since the guide member 7 is configured to allow contact between the locking base 6 and the lock teeth 32b when subjected to a predetermined load after the pretensioner 4 is shifted to the steady driving state, it is possible to increase the resistance applied to the webbing at the time of energy absorption by the occupant after the completion of the operation of the pretensioner 4.

In order to achieve the object of the present invention, it is also conceivable that the contact between the locking base 6 and the lock teeth 32b is restricted until the operation of the pretensioner 4 is completed, and the contact between the locking base 6 and the lock teeth 32b is allowed after the operation of the pretensioner 4 is completed.

In this case, it is difficult to manage the timing at which the locking base 6 and the lock teeth 32b are brought into contact with each other, and the effect of increasing the resistance when energy is absorbed may become unstable. Therefore, in the present embodiment, in order to stabilize the effect of increasing the resistance when energy is absorbed, a predetermined load is set to a numerical value that allows plastic deformation of the guide member 7 such that the locking base 6 and the locking tooth 32b can come into contact with each other when the pretensioner 4 is shifted to the steady driving state.

Figure 7A:
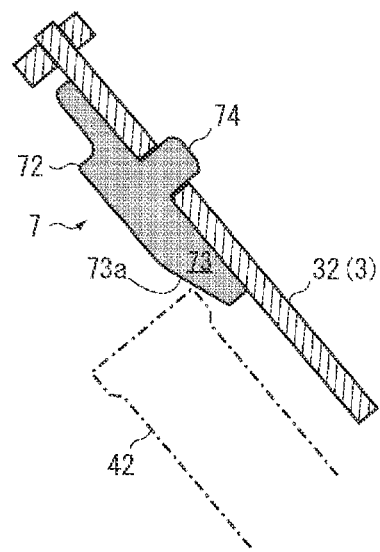
Figure 7B:
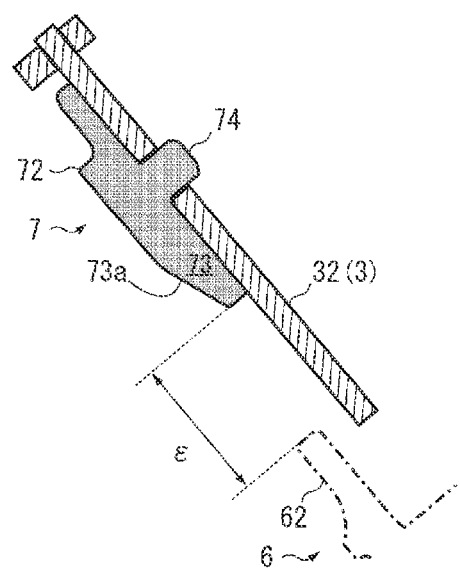

Next, an action of the distal end portion 73 of the guide member 7 will be described with reference to FIGS. 2A, 7A and 7B. FIG. 7A and FIG. 7B are diagrams illustrating the action of the distal end portion of the guide member, in which FIG. 7A shows a relation with the power transmission member, and FIG. 7B shows a relation with the locking base. FIG. 7A and FIG. 7B are cross-sectional views taken along line C-C in FIG. 3B. In the drawings, the guide member 7 is grayed out for the convenience of description. In the drawings, a state before the fixed terminal 74 is crimped is illustrated.

The distal end portion 73 includes a tapered surface 73a inclined toward the upstream side. The tapered surface 73a is formed to absorb an impact caused by a collision between the moving power transmission member 42 and the guide member 7. Therefore, the tapered surface 73a is formed so as to be exposed to the passage of the power transmission member 42, and is formed in a portion where a distal end of the power transmission member 42 can come into contact, as shown in FIG. 7A. For the convenience of description, the power transmission member 42 is illustrated by a dashed line.

As shown in FIG. 7B, even when the rotation shaft of the spool 2 is eccentric, the size of the gap ε is designed such that the flange portion 62 of the locking base 6 does not come into contact with the guide member 7. For the convenience of description, the locking base 6 including the flange portion 62 is illustrated by a dashed line.

In this way, by forming the distal end portion 73 having the tapered surface 73a by extending a part of the guide member 7 in the vicinity of an inlet of the passage of the power transmission member 42, the impact due to the collision between the guide member 7 and the power transmission member 42 can be absorbed, and the movement of the power transmission member 42 can be stabilized. The extension portion 72 can be formed between the distal end portion 73 and the main body portion 71, and the fixed terminal 74 can be disposed in a balanced manner.

Figure 8:
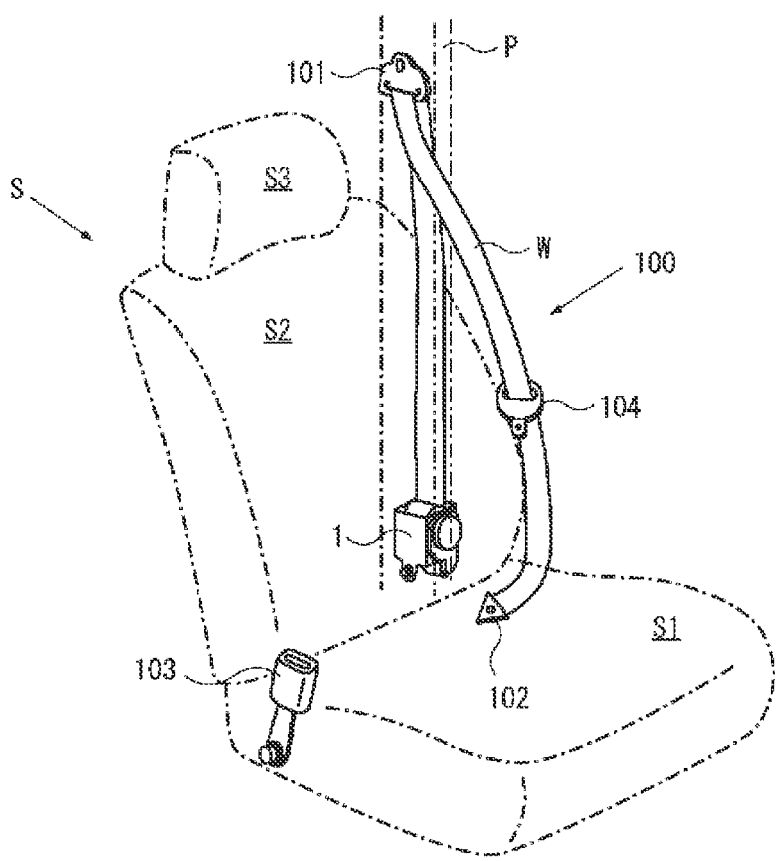
FIG. 8 is an overall configuration diagram showing a seat belt device according to an embodiment of the present invention.

Next, a seat belt device according to an embodiment of the present invention will be described with reference to FIG. 8. Here, FIG. 8 is an overall configuration diagram showing the seat belt device according to the embodiment of the present invention. In FIG. 8, for the convenience of description, components other than the seat belt device are illustrated by dashed lines.

A seat belt device 100 according to the present embodiment shown in FIG. 8 includes a webbing W that restrains an occupant, the seat belt retractor 1 that winds up the webbing W, a guide anchor 101 that is provided on a vehicle body side and guides the webbing W, a belt anchor 102 that fixes the webbing W to the vehicle body side, a buckle 103 disposed on a side surface of a seat S, and a tongue 104 disposed on the webbing W, and the seat belt retractor 1 has, for example, the configuration shown in FIG. 1.

Components other than the seat belt retractor 1 will be briefly described below. The seat S includes, for example, a seat portion S1 on which an occupant sits, a backrest portion S2 positioned behind the occupant, and a headrest portion S3 that supports a head portion of the occupant. The seat belt retractor 1 is built in, for example, a B-pillar P of a vehicle body. The buckle 103 is generally disposed on a side surface of the seat portion S1, and the belt anchor 102 is generally disposed on a lower surface of the seat portion S1. In many cases, the guide anchor 101 is disposed on the B-pillar P. The webbing W has one end connected to the belt anchor 102 and the other end connected to the seat belt retractor 1 via the guide anchor 101.

Therefore, when the tongue 104 is fitted into the buckle 103, the webbing W is pulled out from the seat belt retractor 1 while sliding through an insertion hole of the guide anchor 101. When the occupant wears a seat belt or releases the seat belt when getting off a vehicle, the spring unit 8 of the seat belt retractor 1 causes the webbing W to be wound up until a certain load is applied.

In the seat belt device 100 described above, the seat belt retractor 1 according to the above embodiment is applied to a normal seat belt device in a front seat. Therefore, according to the seat belt device 100 of the present embodiment, it is possible to adjust the amount of eccentricity of a rotation shaft of the spool 2 including the locking base 6 by the guide member 7, and it is possible to increase the resistance to be applied to the webbing W when energy is absorbed while suppressing an increase in frictional resistance when the pretensioner 4 is steadily driven.

The seat belt device 100 according to the present embodiment is not limited to the application to the front seat and can be easily applied to, for example, a rear seat by omitting the guide anchor 101. The seat belt device 100 according to the present embodiment can also be used in a conveyance other than a vehicle.

The present invention is not limited to the above embodiments, and various modifications can be made without departing from the scope of the present invention.

REFERENCE SIGNS LIST 1 seat belt retractor
2 spool
3 base frame
4 pretensioner
5 lock mechanism
6 locking base
7 guide member
8 spring unit
9 vehicle sensor
21 torsion bar
31 first end surface
31a opening portion
32 second end surface
32a opening portion
32b lock teeth
32c through hole
33 side surface
34 tie plate
41 ring gear
42 power transmission member
43 pipe
44 gas generator
45 piston
46 guide block
47 pretensioner cover
51 retainer cover
61 shaft portion
62 flange portion
63 convex portion
71 main body portion
72 extension portion
73 distal end portion
73a tapered surface
74 fixed terminal
100 seat belt device
101 guide anchor
102 belt anchor
103 buckle
104 tongue

The invention claimed is:

1. A seat belt retractor comprising:
a spool configured to wind up a webbing that restrains an occupant;
a base frame configured to rotatably enclose the spool;
a pretensioner capable of winding up the webbing in an emergency;
a lock mechanism capable of stopping the pull-out of the webbing; and
a locking base configured to connect the spool and the lock mechanism, wherein the base frame includes:
an opening portion through which the locking base is inserted,
lock teeth formed on an inner circumference of the opening portion and capable of engaging with a part of the lock mechanism, and
a guide member facing at least a part of an outer circumferential surface of the locking base and disposed along the opening portion, and
the guide member is configured not to come into contact with the locking base until the pretensioner is shifted to a steady driving state, is configured to come into contact with the locking base when the pretensioner is steadily driven, and is configured to allow contact between the lock teeth and the locking base when subjected to a predetermined load after the pretensioner is shifted to the steady driving state.

2. The seat belt retractor according to claim 1, wherein the guide member is plastically deformed when subjected to the predetermined load.

3. The seat belt retractor according to claim 1, wherein the guide member includes, in an initial state, a main body portion having a gap $\alpha$ with the locking base, and an extension portion adjacent to an upstream side of the main body portion and having a gap $\delta$ with the locking base, and a gap $\beta$ between the locking base and the opening portion has a relation of $\alpha \leq \beta < \delta$.

4. The seat belt retractor according to claim 3, wherein the guide member includes a distal end portion adjacent to an upstream side of the extension portion and having a gap $\varepsilon$ with the locking base, where $\varepsilon > \delta$.

5. The seat belt retractor according to claim 4, wherein the distal end portion includes a tapered surface inclined toward an upstream side.

6. The seat belt retractor according to claim 3, wherein the guide member includes a plurality of fixed terminals disposed in the main body portion and the extension portion.

7. The seat belt retractor according to claim 1, wherein the guide member has a predetermined gap $\gamma$ between a back surface thereof and the base frame.

8. The seat belt retractor according to claim 1, wherein a ring gear rotated by operation of the pretensioner is disposed on a shaft portion of the locking base, and the guide member is disposed in a region opposite to a portion where a power transmission member of the pretensioner rotates the ring gear.

9. A seat belt device comprising the seat belt retractor according to claim 1.

* * * * *